UNITED STATES PATENT OFFICE.

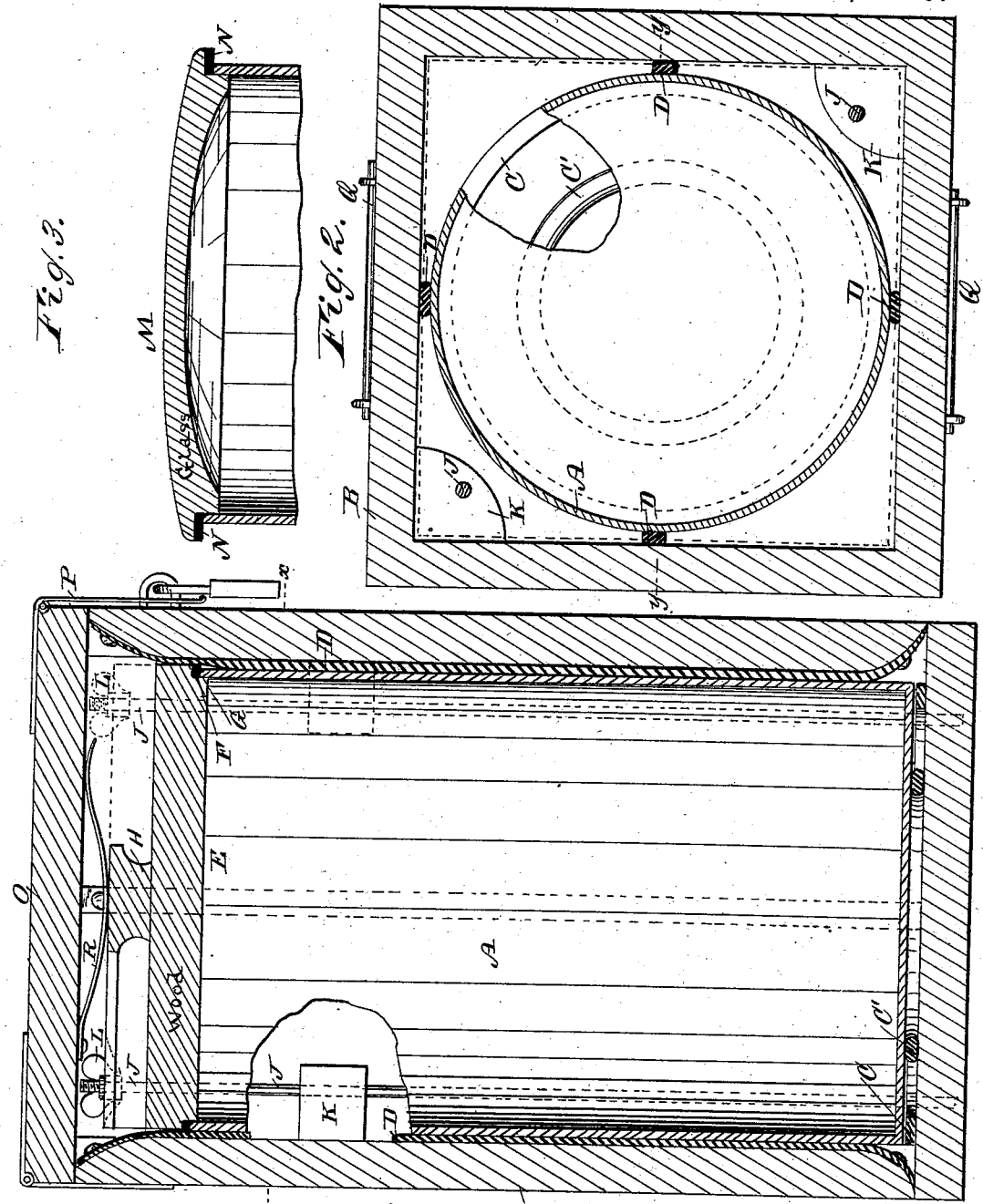

WILLIAM W. WESTON, OF HONESDALE, PENNSYLVANIA.

GLASS BUTTER JAR, BOX, AND COVER.

SPECIFICATION forming part of Letters Patent No. 289,589, dated December 4, 1883.

Application filed June 28, 1883. (No model.)

*To all whom it may concern:*

Be it known that I, WILLIAM W. WESTON, of Honesdale, in the county of Wayne and State of Pennsylvania, have invented a new and Improved Glass Butter Jar, Box, and Cover, of which the following is a full, clear, and exact description.

The object of my invention is to provide a new and improved glass butter-jar, which can be transported easily and safely, and is not apt to be broken by ordinary handling, and which jar is sealed hermetically, so that the butter will not be exposed to the atmosphere in any way whatever.

The invention consists in a glass jar, placed in a box provided with suitable packing, which glass jar has a wooden or glass cover on which a diagonal cross-piece rests, through the ends of which the screw-threaded ends of rods pass which are secured in the bottom of the box, and project upward, thereby holding the cover of the jar firmly on the said jar, and also holding the jar in place in the box, thus making the jar a safe and cheap butter-package.

Reference is to be had to the accompanying drawings, forming part of this specification, in which similar letters of reference indicate corresponding parts in all the figures.

Figure 1 is a cross-sectional elevation of my improved glass butter jar, box, and cover on the line *y y*, Fig. 1, with a portion broken away. Fig. 2 is a sectional plan view on the line *x x*, Fig. 1. Fig. 3 is a cross-sectional view, showing the glass cover.

A glass butter-jar, A, is placed in a box, B, of such height that the upper edge of the box will be a short distance above the upper edge of the jar. Two circular packing-strips, C C', of rubber, felt, &c., are secured on the upper surface of the bottom of the box, on the outer of which strips the edge of the bottom of the jar A is to rest. The inner strip supports the middle portion of the bottom of the jar. Packing-strips D of rubber, felt, &c., are secured to the middle of the inner surface of each side of the box and extend from the bottom to the top. The wooden cover E, which is made square to fit closely in the box, is provided in its bottom-surface with an annular groove, F, for receiving the upper edge of the jar, which groove contains a rubber or felt packing-ring, G. A bar, H, is passed diagonally across the top of the cover E, and is provided at the ends with apertures through which the upper screw-threaded ends of rods J pass, which are secured in the bottom of the box and pass through brackets K in the corners of the box, which brackets hold the rods straight and in position. Washers are passed over the upper ends of the said rods, and winged nuts L are screwed on the rods, which nuts press the cross-bar H downward, which in turn presses the cover firmly on the upper edge of the jar. If desired, a glass cover, M, may be used in place of the wooden cover, which glass cover is provided along the edge with a rabbet, in which a packing-ring, N, is placed, which is adapted to rest on the upper edge of the jar. The glass cover is also held is place by a cross-piece, H. The box B is provided with a hinged cover, O, provided with a hasp, P. A bent or bow spring, R, is fastened on the under side of the cover O and flattens down on the cross-piece H. It also tends to increase the general elasticity. The box B is also provided with suitable handles, Q. The glass jar is held firmly and rigidly between the bottom of the box and the cover of the jar. It is held between packing-strips, which break all strains and jars, and thus protect the jar. As its top is held from the bottom of the box by the rods J, the danger of breaking or cracking the jar by ordinary handling is materially decreased. The jar can be made in various suitable sizes.

In place of the winged nuts used to hold the diagonal strip J in place, wedges or other keys can be used, which are passed through hoops or eyes at the upper ends of the rod.

One of the main advantages of my improved butter-tub is that it is hermetically sealed, and the butter can be kept sweet for an indefinite period of time and is not affected by the weather.

Having thus described my invention, what I claim as new, and desire to secure by Letters Patent, is—

1. The combination, with a jar, of a box for receiving it, a cover for the jar, a diagonal cross-piece on the cover, and rods extending upward from the bottom of the box, on which rods the ends of the diagonal cross-piece are placed, and means for holding them thereon, substantially as herein shown and described.

2. The combination, with a jar, of a box, having packing-strips on the inner surfaces of the sides and on the upper surface of the bottom, a cover for the jar, a cross-piece resting diagonally over the same, rods secured to the bottom of the box and passing through the ends of the cross-piece, and means for holding the cross-piece on the rods, substantially as herein shown and described.

3. The combination, with the jar A, of the box B, having packing-strips C C' D, the cover of the jar, the diagonal cross-piece H', the rods J, secured in the bottom of the box and projecting upward in the interior of the box, and having their upper ends screw-threaded, and the winged nuts L, screwed on the upper ends of the rods, substantially as herein shown and described.

WILLIAM W. WESTON.

Witnesses:
CHAS. F. SPENCER,
CHAS. P. ELDRED.